(12) United States Patent
Fluhrer et al.

(10) Patent No.: US 8,705,348 B2
(45) Date of Patent: Apr. 22, 2014

(54) USE OF METADATA FOR TIME BASED ANTI-REPLAY

(75) Inventors: Scott Roy Fluhrer, North Attleboro, MA (US); Lingyan Huang, Milpitas, CA (US); Brian E. Weis, San Jose, CA (US); Sheela Dixit Rowles, Cupertino, CA (US)

(73) Assignee: Cisco Technology, Inc., San Jose, CA (US)

(*) Notice: Subject to any disclaimer, the term of this patent is extended or adjusted under 35 U.S.C. 154(b) by 1174 days.

(21) Appl. No.: 11/737,007

(22) Filed: Apr. 18, 2007

(65) Prior Publication Data

US 2008/0260151 A1 Oct. 23, 2008

(51) Int. Cl.
G01R 31/08 (2006.01)
H04L 12/28 (2006.01)
H04K 1/00 (2006.01)
H04N 7/167 (2011.01)

(52) U.S. Cl.
USPC ............. 370/229; 370/389; 380/28; 380/255; 380/275

(58) Field of Classification Search
None
See application file for complete search history.

(56) References Cited

U.S. PATENT DOCUMENTS

| | | | | |
|---|---|---|---|---|
| 2003/0142696 A1* | 7/2003 | Holmeide et al. | ............ | 370/508 |
| 2004/0008844 A1* | 1/2004 | Lide et al. | ..................... | 380/275 |
| 2004/0122956 A1* | 6/2004 | Myers et al. | .................. | 709/228 |
| 2006/0050869 A1* | 3/2006 | Tuvell et al. | ..................... | 380/28 |
| 2006/0218625 A1* | 9/2006 | Pearson et al. | ..................... | 726/4 |
| 2006/0239218 A1 | 10/2006 | Weis et al. | | |
| 2007/0260870 A1* | 11/2007 | Nissan et al. | ................. | 713/150 |
| 2007/0286073 A1* | 12/2007 | Pullen et al. | .................. | 370/229 |
| 2008/0181215 A1* | 7/2008 | Bollich et al. | ................ | 370/389 |

OTHER PUBLICATIONS

Gouda, M. G., C.-T. Huang, E. Li, "Anti-Replay Window Protocols for Secure IP", Proceedings of the 9th IEEE International Conference on ComputerCommunications and Networks, Las Vegas, Oct. 2000.
Cisco Systems, Inc. IPSec Anti-Replay Window: Expanding and Disabling. Published Feb. 28, 2005. http://www.cisco.com/en/US/products/sw/iosswrel/ps5207/products_feature_guide09186a0080371665.html.
Zhao, F. Wu, S.F, "Analysis and improvement on IPSec anti-replay window protocol", Proceedings of the 12th International Conference on Computer Communications and Networks, 2003.

* cited by examiner

*Primary Examiner* — Brandon Renner
(74) *Attorney, Agent, or Firm* — Schwegman Lundberg & Woessner, P.A.

(57) ABSTRACT

A system and method for facilitating anti-replay protection with multi-sender traffic is disclosed. The system employs time-based anti-replay protection wherein a sender transmits a data packet with a pseudo-timestamp encapsulated in a metadata payload. At the receiving end, the receiver compares the pseudo-timestamp information received with its own pseudo-time, determines if a packet is valid, and rejects a replay packet. The pseudo-time information is transmitted through the metadata payload and new fields need not be added to the IPSec (IP Security) Protocol, thus the existing hardware can be employed without any changes or modifications.

21 Claims, 13 Drawing Sheets

US 8,705,348 B2

USE OF METADATA FOR TIME BASED ANTI-REPLAY

TECHNICAL FIELD

The subject disclosure relates generally to network technology and security and more particularly discloses a system for time based anti-replay that employs a method that encapsulates a pseudo-timestamp in a metadata payload.

BACKGROUND

Increased risk in network security gives rise to various challenges to ensure secure and effective communication between devices in a network. Anti-replay techniques can be employed for secure communication over a network to avoid replay attacks. Anti-replay helps prevent an intercepted packet of data to be sent to a receiver multiple times wherein the sender is unaware of the replay of the message. Anti-replay ensures IP (Internet Protocol) packet-level security by making it difficult for a hacker or other malicious agent to copy message packets and send them repeatedly into the data stream between a source computer and a destination computer.

Most data encryption protocols, such as Internet Protocol Security (IPSec) include anti-replay mechanisms to detect replayed packets at the receiving end. If a receiver cannot detect replayed packets, a hacker can employ the replayed packet to cause the receiver to accept stale data such that the receiver is unaware that the data received is not fresh. In general, time sensitive packets can be greatly affected by such replays.

Further, processing replayed packets can waste resources. Replayed packets can cause the decryption module at the receiving end to unnecessarily expend CPU (central processing unit) or memory resources. An attacker can keep resending a packet thereby wasting system resources and employing the replayed packets in Denial of Service (DoS) attacks as well as attacks to fool the receiver.

As the number of devices in the network increases, these attacks can produce disastrous consequences. Conventionally, these attacks can be avoided by employing a sequence number based anti-replay mechanism that keeps track of sequence numbers in each packet as the packet arrives at the receiver. Each packet is assigned a sequence number by a sender. For example, the first packet sent will have a sequence number of 1, the second 2, and so on. Each time a packet is sent, the receiver verifies that the number is not that of a previously sent packet. When detection of a replayed packet occurs, such that the receiver receives packets out of sequence, the program sends an error message, discards the replayed packet, and logs the event—including in the log entry identifiers such as the date/time received, source address, destination address, and the sequence number.

The traditional sequence number anti-replay mechanism, however, is designed for pair-wise communications between two systems and can only provide replay protection to detect duplicate packets between two systems. It cannot be expanded to protect multi-sender group traffic. For example, if IPSec is employed to protect multi-sender group traffic, replay protection can become problematic since multiple senders can use the same sequence number. Thus, the receiver might drop a valid data packet received from a sender that employed the same sequence number as another sender. In other words, IPSec sequence numbers cannot prevent replay in a multi-sender group traffic scenarios because the uniqueness property of sequence numbers is violated and thus receiving two packets having the same sequence number does not necessarily indicate replay.

DESCRIPTION

Overview

Figure 1:
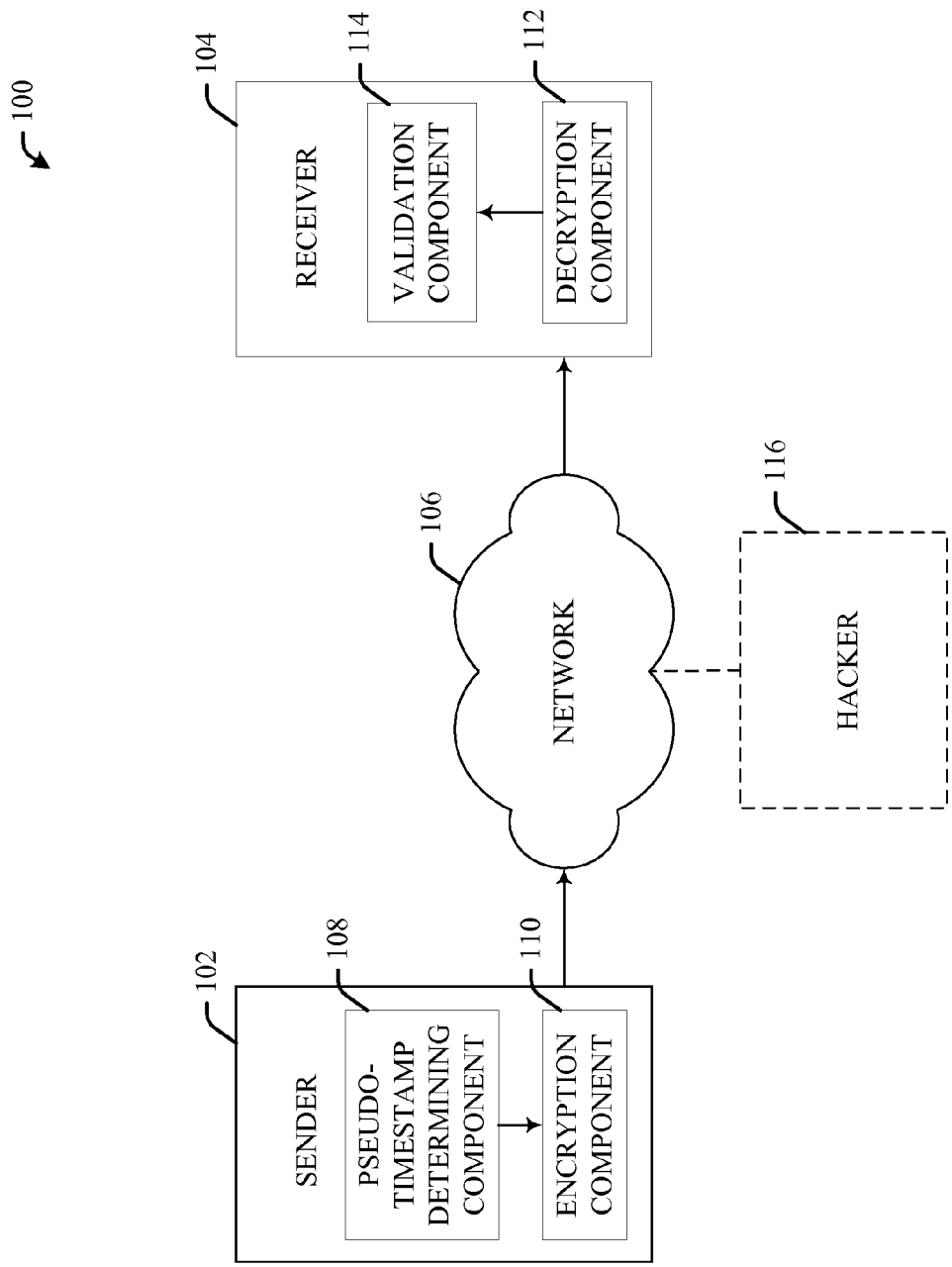
FIG. 1 illustrates a block diagram of an example system that facilitates the transmission of a pseudo-timestamp encapsulated in a metadata payload along with a data packet to avoid anti-replay.

The following presents a simplified overview of the claimed subject matter in order to provide a basic understanding of some embodiments described herein. This is not an extensive overview of the claimed subject matter. It is intended to neither identify key or critical elements of the claimed subject matter nor to delineate the scope of that subject matter. Its sole purpose is to present some concepts of the claimed subject matter in a simplified form as a prelude to the more detailed description of example embodiments that is presented later.

The system disclosed and claimed herein, in one aspect thereof, facilitates the transmission of a data packet from a sender to a receiver such that a valid data packet is retained and a replay packet is rejected. In operation, the sender encrypts the data packet and transmits a pseudo-timestamp along with the packet. On receiving the packet, the receiver decrypts the packet and determines whether the packet is a valid packet or a replay packet based on the pseudo-timestamp value.

According to an aspect of the system, a pseudo-time determining component, at the sender's side, employs the time obtained from a local clock, to generate a timestamp, referred to as a pseudo-timestamp. In aspects, the local clocks on the sender and receiver side can be synchronized using various techniques. The pseudo-timestamp generated is employed by an encryption component that encapsulates the metadata payload with the generated pseudo-timestamp. The sender then transmits this encrypted data packet to the desired receiver over a network.

In accordance with another aspect of the specification, a decryption component on the receiver's side, receives an encrypted data packet and decrypts it to obtain the pseudo-timestamp value. A validation component employs the pseudo-timestamp value and compares it with the local clock. The data packet is accepted for further processing (or rejected as appropriate) based upon the analysis performed by the validation component.

Another aspect of the claimed subject matter relates to a method to analyze if a received data packet is valid or not. The pseudo-timestamp value obtained from decrypting the received packet refers to the time the packet was sent by a sender. If the difference between the time the packet is received and the time the packet was sent is less than a predetermined amount then the packet is accepted else, the packet is considered to be stale and is not processed, thereby deterring the replay of a packet.

Yet another aspect of the subject specification describes a Synchronous Anti-replay (SAR) mechanism employed in a Dynamic Group Virtual Private Network (DGVPN) to perform anti-replay protection for a multi-sender group. Multiple senders employ the same key for encryption of data packet but employ a Metadata protocol to encapsulate the pseudo-timestamp for supporting SAR. In aspects, the Metadata protocol holds the pseudo-timestamp in its metadata payload. Thus, new fields new fields need not be added to the existing ESP/AH (Encapsulating Security Payload/Authentication Header) protocol. Furthermore, since no new fields are added, the existing hardware is utilized without any changes to the hardware crypto engines.

The following description and the annexed drawings set forth in detail certain illustrative embodiments of the claimed subject matter. These embodiments may be indicative, however, of but a few of the various ways in which the principles of the claimed subject matter may be employed and the claimed subject matter is intended to include many and/or all such embodiments and their equivalents. Other advantages and novel features of the claimed subject matter will become apparent from the following description of example embodiments when considered in conjunction with the drawings.

DESCRIPTION OF EXAMPLE EMBODIMENTS

The specification is now described with reference to the drawings, wherein like reference numerals are used to refer to like elements throughout. In the following description, for purposes of explanation, numerous specific details are set forth in order to provide a thorough understanding of the subject specification. It may be evident, however, that the specification can be practiced without these specific details. In other instances, well-known structures and devices are shown in block diagram form in order to facilitate describing the specification.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In the following description, "metadata" is described as being transmitted within packets in accordance with a Metadata Protocol. However, it is important to note that these examples are merely illustrative. Thus, metadata may also be transmitted in frames. Accordingly, the terms "packets" and "frames" are used interchangeably.

In this description, "pseudo-timestamp" may refer to any set of values representing moments in time, and similarly a pseudo-timestamp is information from which one of the set of values can be determined. For specific embodiments, specific sets of time values may be substituted, such as those of a "wall clock" or other sets of values that are not those of a wall clock may be substituted. The term "wall clock" refers to a clock that provides a reference or a master time.

In this description, "encrypted" is described as being encapsulated with a security protocol such as ESP (Encapsulating Security Payload) where a cipher is employed to provide confidentiality and/or authentication.

Referring initially to the drawings, FIG. 1 illustrates a communication system 100 wherein two communication nodes 102, 104 can be communicatively coupled over a network 106. Typically, a network can include, but is not limited to, the internet, an intranet, a Local Area network (LAN), a Wide Area network (WAN), a Metropolitan Area network (MAN) or a wireless network. A sender 102 can transmit a data packet to a receiver 104 over the network 106. The system 100 employs a mechanism for anti-replay protection such that the receiver 104 can process a valid packet and a replay packet can be rejected or dropped. The sender 102 and the receiver 104 can each employ a local pseudo-time clock (not shown) or can obtain the pseudo-time from a central clock (not shown) to determine a time when the data packet is sent and a time when the data packet is received. If the difference between these times is greater than a predetermined value, the data packet is rejected by the receiver 104.

While transmitting a data packet, the sender 102 can employ a pseudo-timestamp determining component 108 to generate a pseudo-timestamp that is transmitted along with the data packet. The pseudo-timestamp generating component 108 can obtain pseudo-time information from either a local clock or a central clock and attach this information to a metadata payload. The pseudo-timestamp information represents a time when the data packet is created. Alternately, the pseudo-timestamp can correspond to any desired time, for example, the time the data packet is sent.

An encryption component 110 can cryptographically alter the timestamp information from the pseudo-timestamp generating component 108 and attach it to the data packet in a metadata payload. The encryption component 110 can employ various cryptographic protocols for encrypting the data packet (e.g. Data Encryption Standard (DES), Advanced Encryption Standard (AES), etc.) and is not limited to employing a single key for encryption. The encrypted data packet along with pseudo-timestamp information can then be transmitted over a network 106 to a receiver 104.

The receiver 104 receives data packets and can decrypt the received packet employing a decryption component 112. The decryption component 112 can decrypt the received packet and obtain the pseudo-timestamp information attached in the metadata payload by the sender. Thus, the receiver 104 can be aware of the time the received data packet was created.

The receiver 104 can generally include a validation component 114 that can employ the pseudo-timestamp information obtained from the decryption component 112 and check if the received packet should be processed or not. The validation component 114 can compare the received pseudo-timestamp information with the current pseudo-time obtained from its local clock or from a central clock. The receiver can use a time-based anti-replay window to accept packets which contain a timestamp value within the window. All other packets can be rejected or dropped; only those packets whose received pseudo-timestamp value falls within the predetermined window can be accepted as valid packets and further processed.

The size of the time-based anti-replay window can be predetermined or can be dynamically changed based on certain communication characteristics. These characteristics can include, but are not limited to packet size, mode of transfer or sender ID.

A hacker 116 could intercept a packet sent on the network 106 to a receiver 104 and replay the packet by resending multiple copies of the packet. However, when the receiver 104 receives such a replayed packet, it can reject the packet using the aforementioned timestamp validation mechanism. The pseudo-timestamp value obtained from the replayed packet can be determined to be greater that the predetermined window and the packet can be rejected by the receiver 104.

Figure 2:
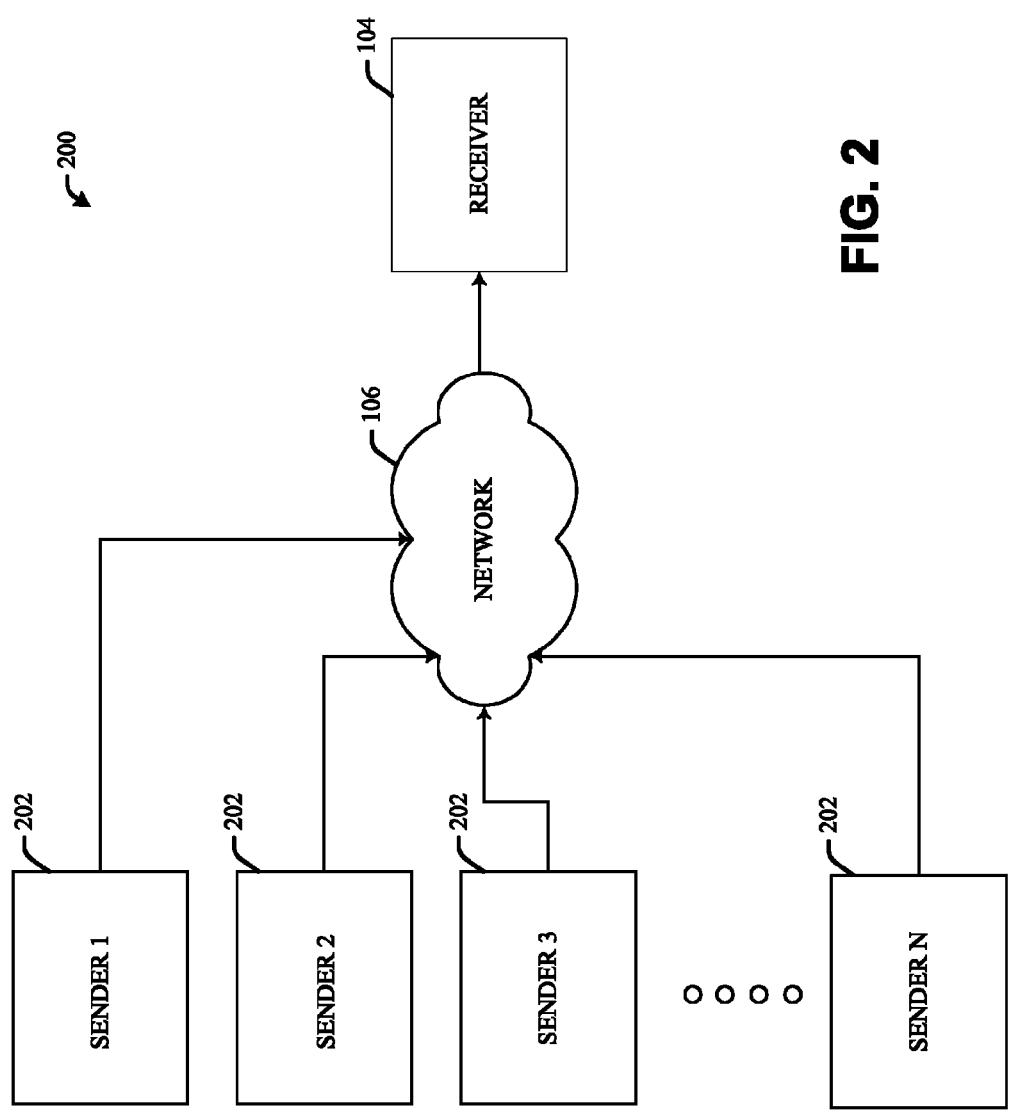
FIG. 2 illustrates a schematic block diagram of an example multi-sender communication system that employs a mechanism for anti-replay protection.

FIG. 2 illustrates a multiple-sender system 200 in accordance with an aspect of the specification. Dynamic Group Virtual Private Network (DGVPN) is an example of multi-sender systems wherein multiple senders 202 can transmit data packets to a receiver 104 using the same encryption key. It can be understood that conventional sequence number based anti-replay cannot be employed to protect multi-sender systems since multiple senders 202 can employ the same sequence number causing the receiver 104 to reject valid data packets received from different senders 202.

Continuing with a discussion of conventional systems, every encryption component in each sender 202 can have its own sequence number. The decryption component 112 (FIG. 1) of the receiver 104 cannot differentiate between packets with same sequence that were created by different senders. Thus, the receiver 104 would treat these packets as replay packets and reject them. For example, if Sender 1 and Sender 2 each send the receiver 104 a data packet with a sequence number 3, the receiver 104 would reject the second packet received with the sequence number 3 even though it is a valid data packet from another sender.

In such scenarios, the subject specification discloses use of a Synchronous Anti-replay (SAR) mechanism is employed for anti-replay protection. Each router in the network 106 can register with a key server (not shown). The key server can authenticate the router, perform an authorization check and download a policy and key to the router. Thus all members of the group can use the same key for encryption and decryption.

Furthermore, a pseudo-timestamp can be sent along with each data packet. The pseudo-timestamp information is compared with the receiver's pseudo-time and the packet is validated based on the difference in time.

Figure 3:
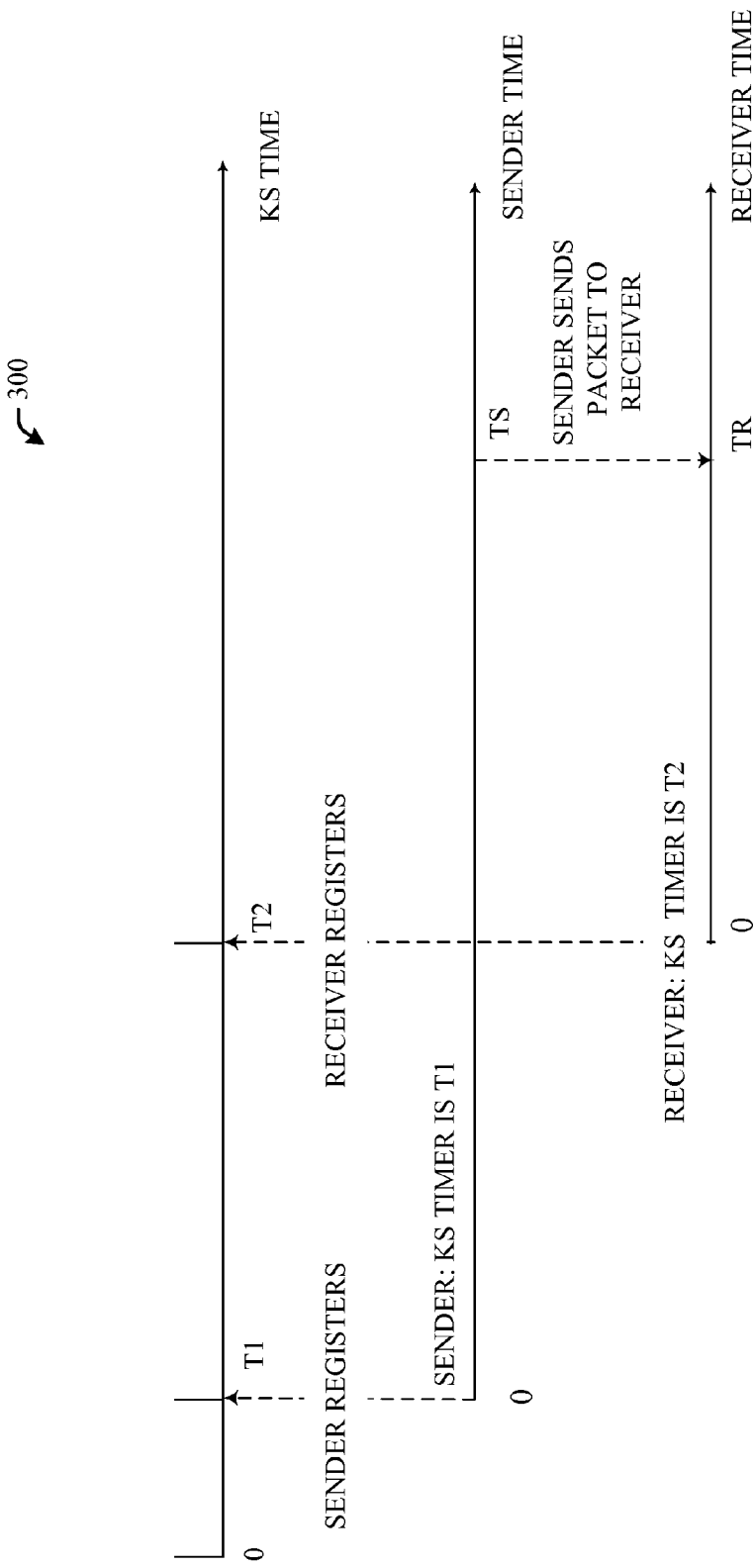
FIG. 3 illustrates an example timeline for pseudo-time calculation in accordance with one aspect of the specification.

Referring now to FIG. 3, there is illustrated a timeline 300 for a sender and receiver that can calculate pseudo-time in accordance with the specification. When time-based anti-replay is enabled for a group of users, a key server (KS) (not shown) can send its pseudo-time along with a window size to the members of the group.

The timer at the sender and the receiver can be initialized by the key server at times T1 and T2 respectively, as shown in the figure. When a sender sends out a data packet, it can calculate a timestamp based on the pseudo-time value obtained from the key server (T1) and its own pseudo-time (TS).

At time TS, a sender can send a data packet to a receiver. The pseudo-time value sent along with the data packet can be determined as T1+TS. When the receiver obtains the data packet, it can calculate its own timer which is T2+TR, as shown in FIG. 3. The receiver can then compare this value from its own timer to that of the pseudo-timestamp.

Figure 4:
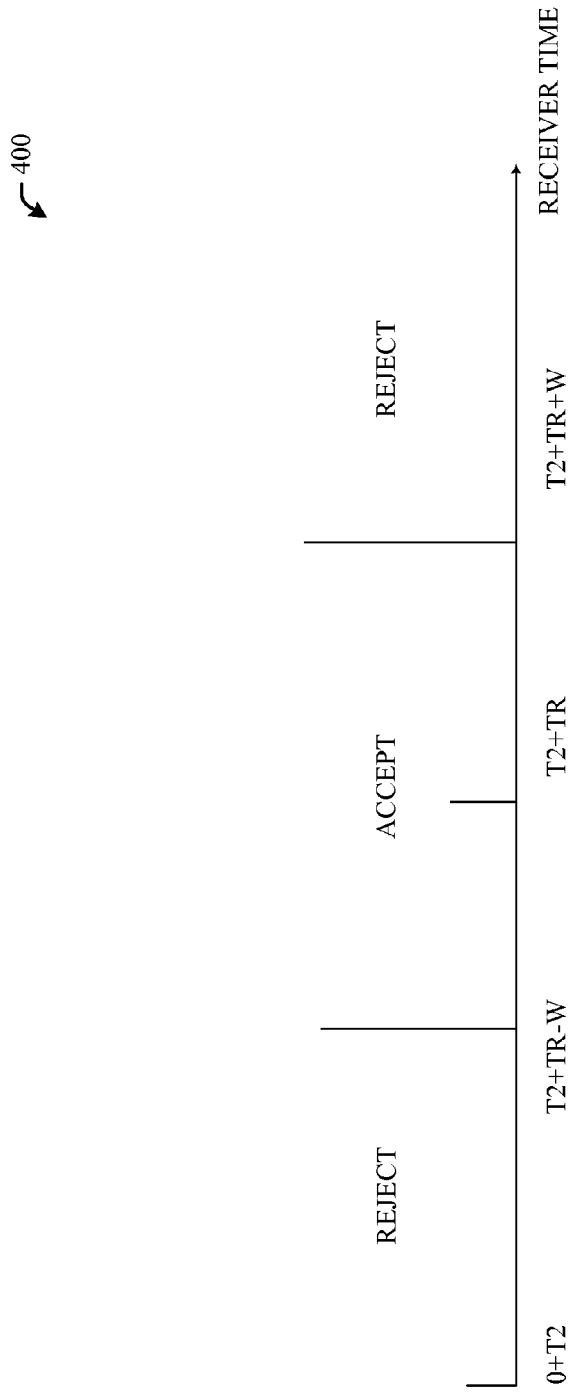
FIG. 4 illustrates an example timeline for verification of pseudo-time during the validation of the received data packet.

FIG. 4 illustrates a timeline 400 of pseudo-time verification during the validation phase in the receiver. The receiver can download a window size (W) from a key server. The pseudo-timestamp value obtained from the received data packet can be compared by the receiver with its own pseudo-time value. Based upon the size of the window (W), a data packet can be validated and accepted for further processing.

As seen from FIG. 3, T2 is the key server's pseudo-timestamp value when the receiver registers with the key server. TR is the receiver's own time according to the receiver's own clock which starts ticking when registration with the key server is completed.

If the receiver determines that the data packet is received between times 0+T2 and T2+TR−W, or after time T2+TR+W, it can identify the data packet as a replay packet and reject it. If, however, the receiver determines that the packet is received between time T2+TR−W and T2+TR+W, the data packet is identified as a valid packet and can be accepted for further processing. Thus, if the following condition is satisfied, the received data packet is considered to be good.

$$(TR+T2-W)<=(TS+T1)<=(TR+T2+W)$$

Wherein TS+T1 is the pseudo-timestamp value attached in the data packet by the sender.

It can be noted however, the analysis for validation of a data packet is not limited to the comparison of a received pseudo-timestamp with the receiver's pseudo-time value. The data packet can be validated by various other mechanisms employing the received pseudo-timestamp. For example, the receiver can record the highest pseudo-timestamp value received from a sender and compare a current received data packet's pseudo-timestamp value to the highest pseudo-timestamp value. If the current received data packet's pseudo-timestamp value is within the window of the highest pseudo-timestamp value, the packet can be accepted and the highest pseudo-timestamp value is updated, if necessary.

Figure 5:
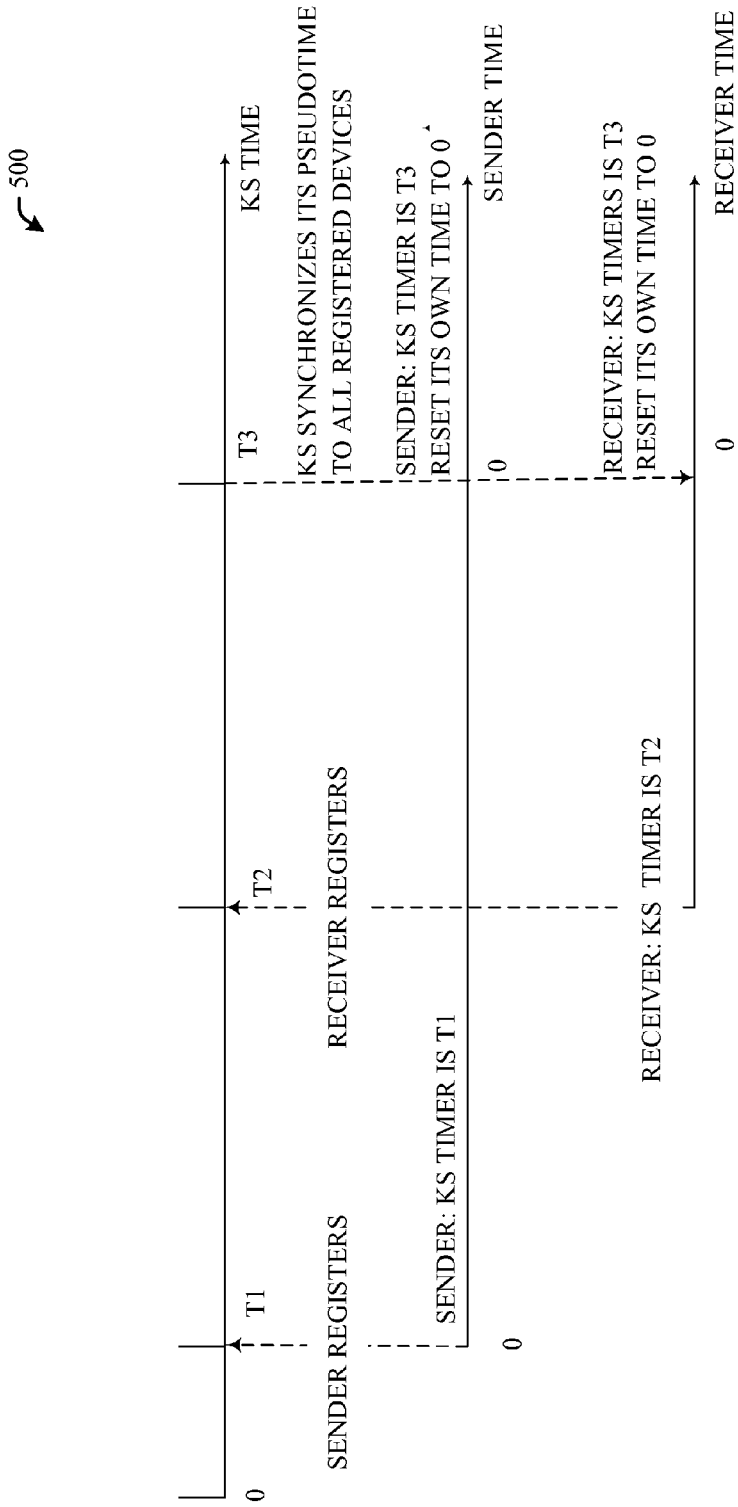
FIG. 5 illustrates an example timeline for systems achieving pseudo-time synchronization with respect to a key server.

FIG. 5 illustrates a timeline for synchronization of pseudo-time in accordance with an aspect of the specification. The sender and receiver maintain their individual pseudo-time. Various mechanisms can be employed for synchronizing the pseudo-time clocks of the devices in a network and can include, but are not limited to different methods such as a self synchronization method, wherein each device synchronizes its local clock with the clocks of other systems or a method to synchronize the local clocks by employing periodic updates from a key server. The key server method includes periodically synchronizing pseudo-time clocks in a sender and receiver to a key server's time such that the key server can periodically reset the different clocks.

As seen from the figure, when the key server's time is at T3, the key server synchronizes the local clocks of all the devices in the network that are registered to that key server. At T3, the key server resets the sender's and receiver's pseudo-time clock to zero.

Figure 6:
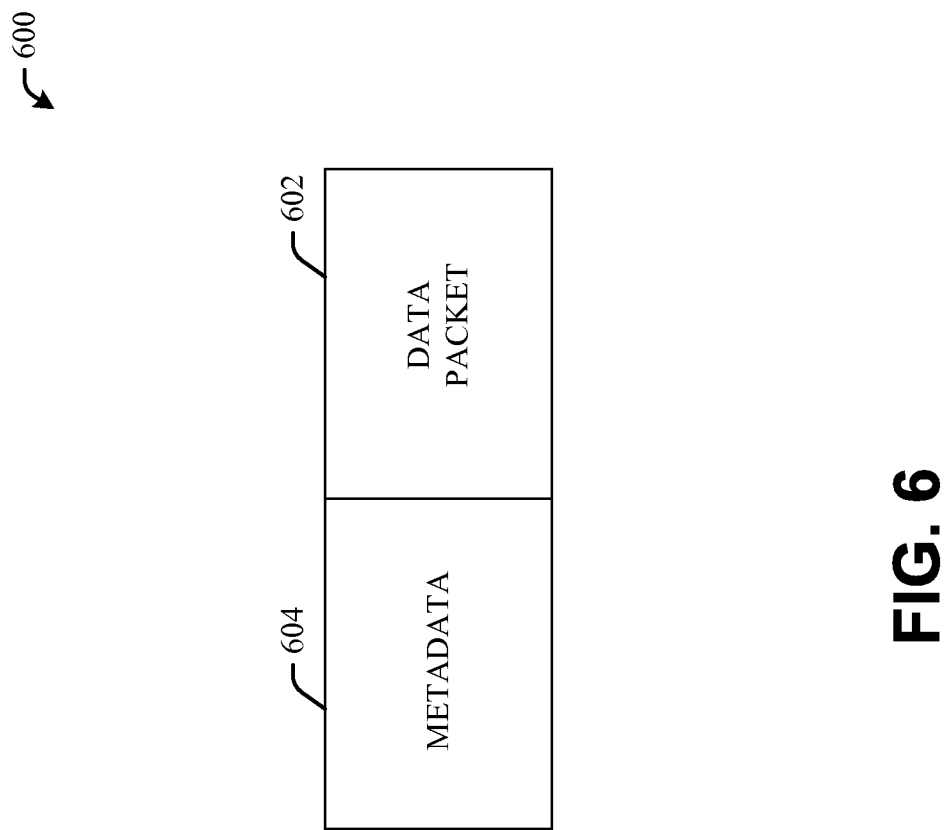
FIG. 6 illustrates an example data packet with metadata, containing pseudo-time information, attached to it.

Now referring to FIG. 6, there illustrated is a data packet 602 with metadata 604 attached to it as per a protocol employed with a network security protocol such as an IPSec (Internet Protocol Security). IPSec is but one example of a network security protocol that can be employed to secure IP (Internet Protocol) communication over a network. IPSec can provide security by authenticating and encrypting the data packet that is transmitted by the sender. IPSec can be implemented by a set of cryptographic protocols for securing data packet flows such as Authentication Header (AH) and Encapsulating Security Payload (ESP). Pseudo-time information can be incorporated in these protocols, however, new fields would have to be added to the existing format or current fields would have to be modified. Such modification would lead to changes in the existing hardware platform. On the other hand, if the pseudo-time information is added in the metadata payload, it would not be necessary to change the existing hardware.

The metadata 604 can carry the pseudo-timestamp information to provide the receiver with the time of creation of the data packet. The pseudo-timestamp can be provided in the form of a metadata option, which can be referred to as a 'Timestamp Option.' For instance, the type of the metadata option may indicate that the metadata option is a timestamp option and the value may include the pseudo-timestamp.

Figure 7:
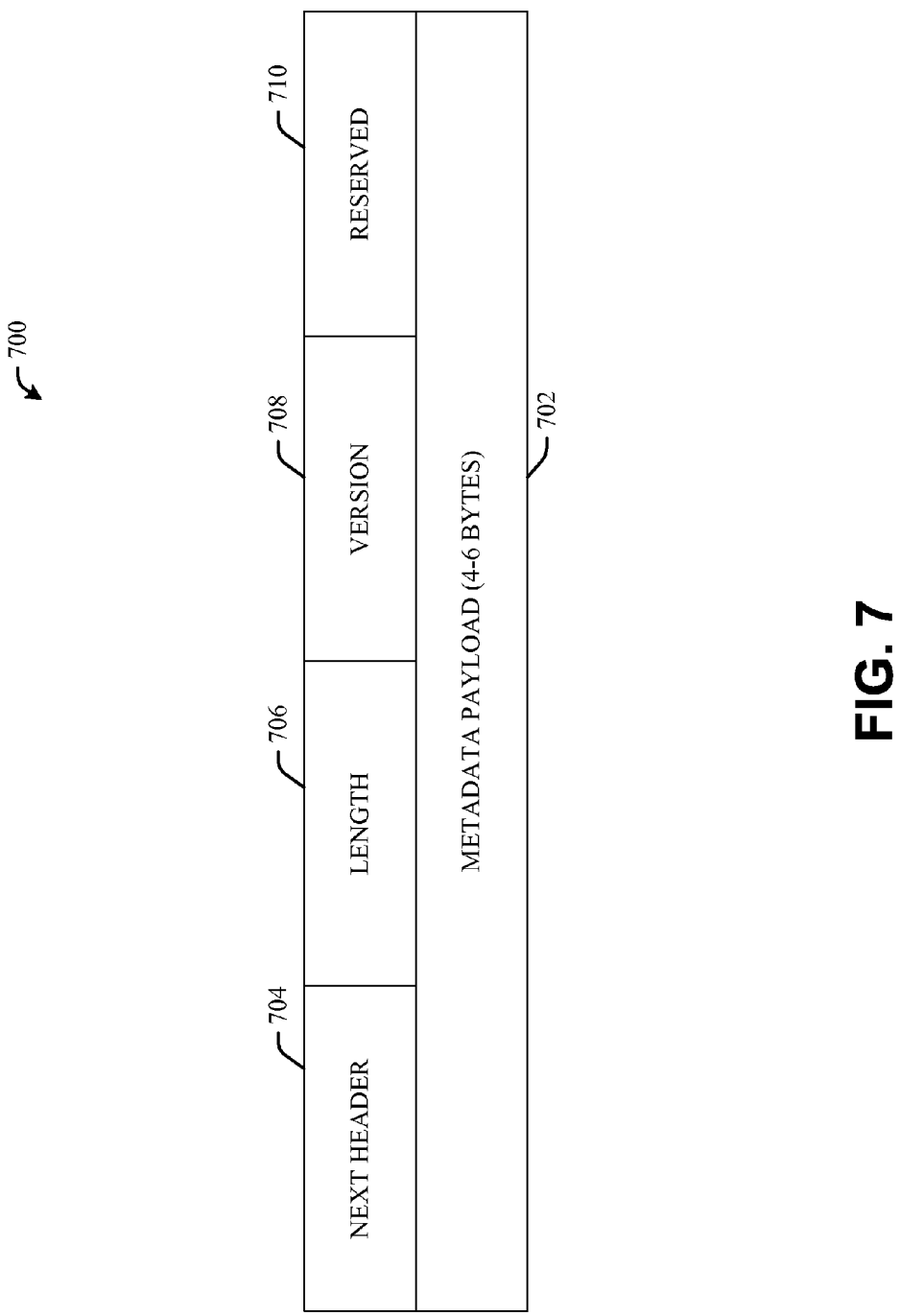
FIG. 7 illustrates an example format of a Metadata protocol.

FIG. 7 illustrates an example Metadata protocol format 700 that includes a metadata payload 702. The system 100 (FIG. 1) can support the transmission of metadata over the network 106 (FIG. 1) without requiring all network devices receiving the metadata to process and understand all of the metadata. More particularly, network devices that do not have the capability to process the metadata can ignore the metadata. This can be accomplished by providing metadata in the form of one or more metadata options. Thus, a network device may process those options that it recognizes and ignore those options that it does not recognize.

The example format illustrated in FIG. 7 includes various options, for example, a next header field 704, a length field 706, a version field 708 and a reserved field 710. The next header field 704 can contain the next level's protocol type and can typically be one byte in size. In one example, the length field 706 can specify the length of the metadata payload 702 in 4-byte units, not including the first four bytes. As an example, valid values can be within a range of 1-15.

The version field 708 can represent the metadata version being implemented. For example, if a first version is being implemented, the version field can hold the value 0001. The reserved field 710 can be employed to implement other functions.

Figure 8:
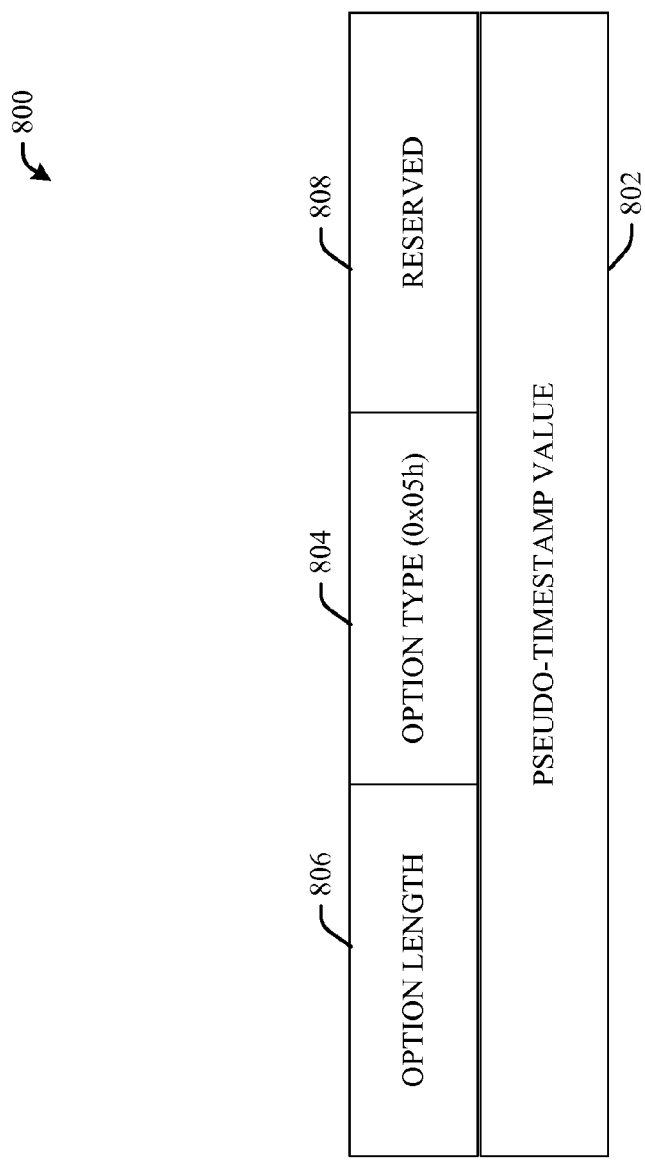
FIG. 8 illustrates an example format for a metadata payload containing a pseudo-timestamp in accordance with an aspect of the specification.

Now referring to FIG. 8, there illustrated is a format for a Metadata protocol wherein a pseudo-timestamp 802 can be inserted in the metadata payload 800. To distinguish that the metadata payload contains a field employed by time-based anti-replay, a new option type 804 can be specified. As an example, a new option type value of 0x05h is selected. Under this metadata payload 800, a length, type, value pattern can be defined on the Metadata protocol to hold different values.

Continuing with the example, the total length of this pattern (length+type+value) can be eight bytes of which two bytes can be set to specify the length/option and four bytes for a value. The most significant three bits of the option can be set for the Option length 806 which can be expressed in multiples of four bytes, not including the first four bytes. The following thirteen bytes can be set for Option type 804 wherein a type 0x05h can be selected to identify a pseudo-timestamp field. The next two bytes can be reserved for future options as shown by the reserved field 808. The last four bytes contain a pseudo-timestamp value 802. This value provides the receiver with information regarding the time when the data packet was created and can be employed to avoid replay of packets.

Figure 9:
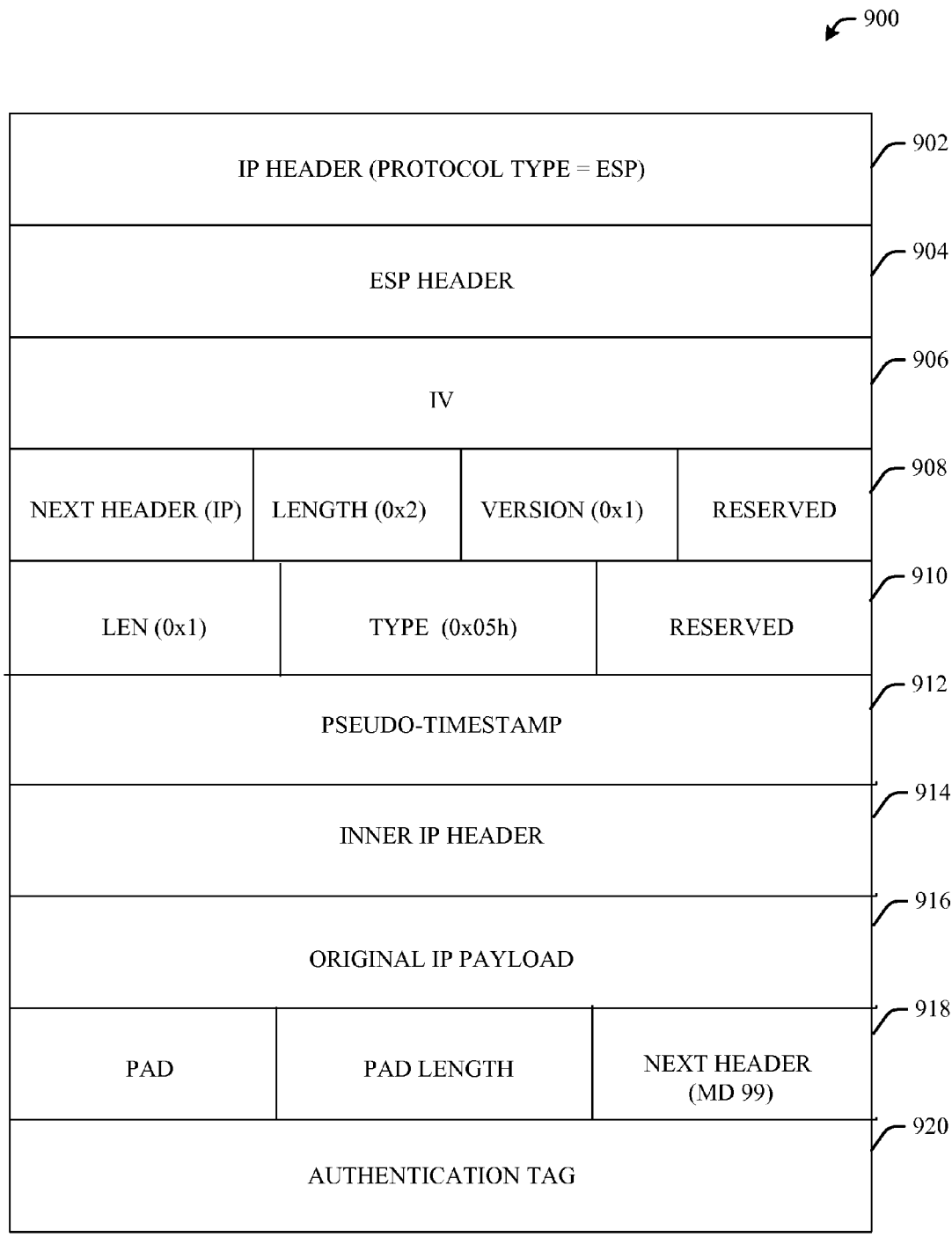
FIG. 9 illustrates an example format for an IPv4 frame supporting anti-replay.

FIG. 9 illustrates a detailed view of an example IPv4 (Internet protocol version 4) frame 900 that supports anti-replay. The frame (lines 902-920) employs a Tunnel mode wherein the entire IP packet (lines 908-918) is encrypted. The Metadata protocol can be identified by overloading the IP (Internet protocol) protocol type 99 intended for any private encryption scheme. Lines 908 to 912 represent the metadata that includes a pseudo-timestamp to support time-based anti-replay protection. As seen from FIG. 9 no new fields are added to the ESP/AH protocol in order to incorporate the pseudo-timestamp.

When the option type 0x05h is obtained after decryption, the receiver can expect a pseudo-time value in the pseudo-timestamp field. The receiver can compare this pseudo-time value to its own pseudo-time value and determine if the packet is a replay packet. Accordingly, a valid data packet can be processed whereas a replayed data packet can be rejected.

Figure 10:
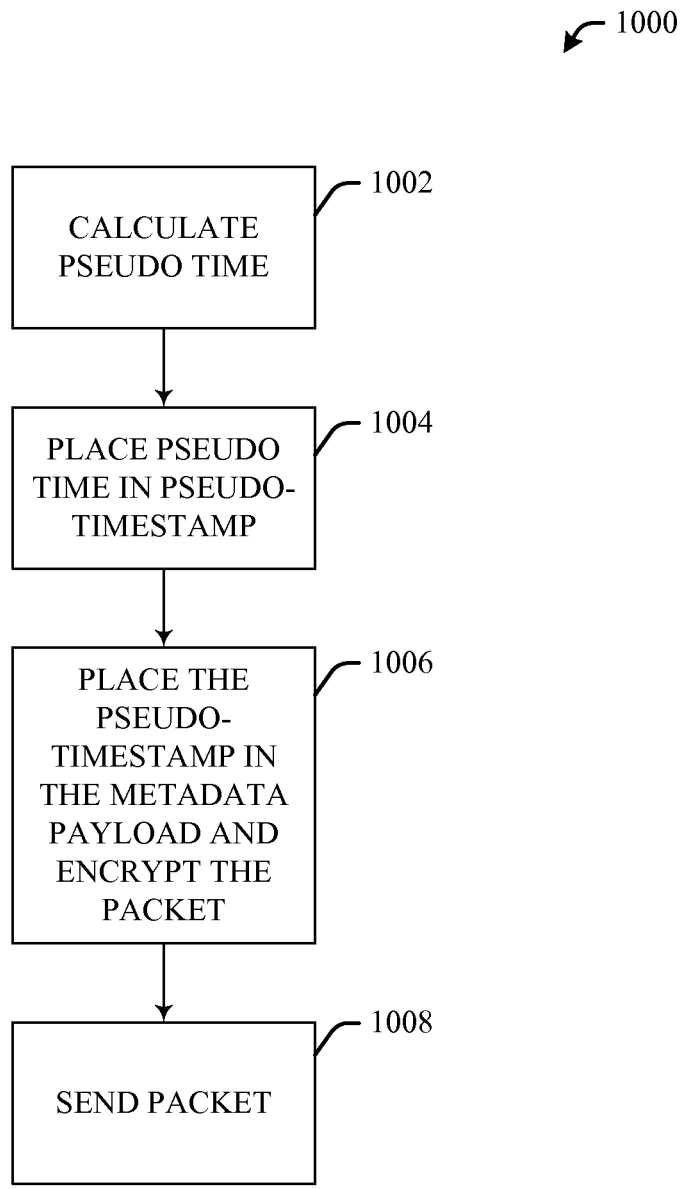
FIG. 10 illustrates an example flow chart of procedures that facilitate transmission of a data packet along with a pseudo-timestamp encapsulated in a metadata payload in accordance with an aspect of the specification.

FIG. 10 illustrates a methodology to facilitate the transmission of a data packet that supports time-based anti-replay protection. While, for purposes of simplicity of explanation, the one or more methodologies shown herein, e.g., in the form of a flow chart, are shown and described as a series of acts, it is to be understood and appreciated that the subject specification is not limited by the order of acts, as some acts may, in accordance with the specification, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the specification.

Referring to FIG. 10, when a sender creates a data packet to send to a receiver, the sender can determine a pseudo-time value to represent the creation time of the data packet at 1002. The pseudo-time value can be determined by a local clock or a system clock.

The pseudo-time value is placed into the pseudo-timestamp at 1004. The pseudo-timestamp is then placed in the metadata payload as per the Metadata protocol and the packet is encrypted using an encryption key at 1006. A group of multiple senders can employ the same encryption key to encrypt the data packet they send. Once the pseudo-timestamp is included in the metadata payload and encrypted, the sender can then transmit the data packet to a receiver over a network at 1008.

Figure 11:
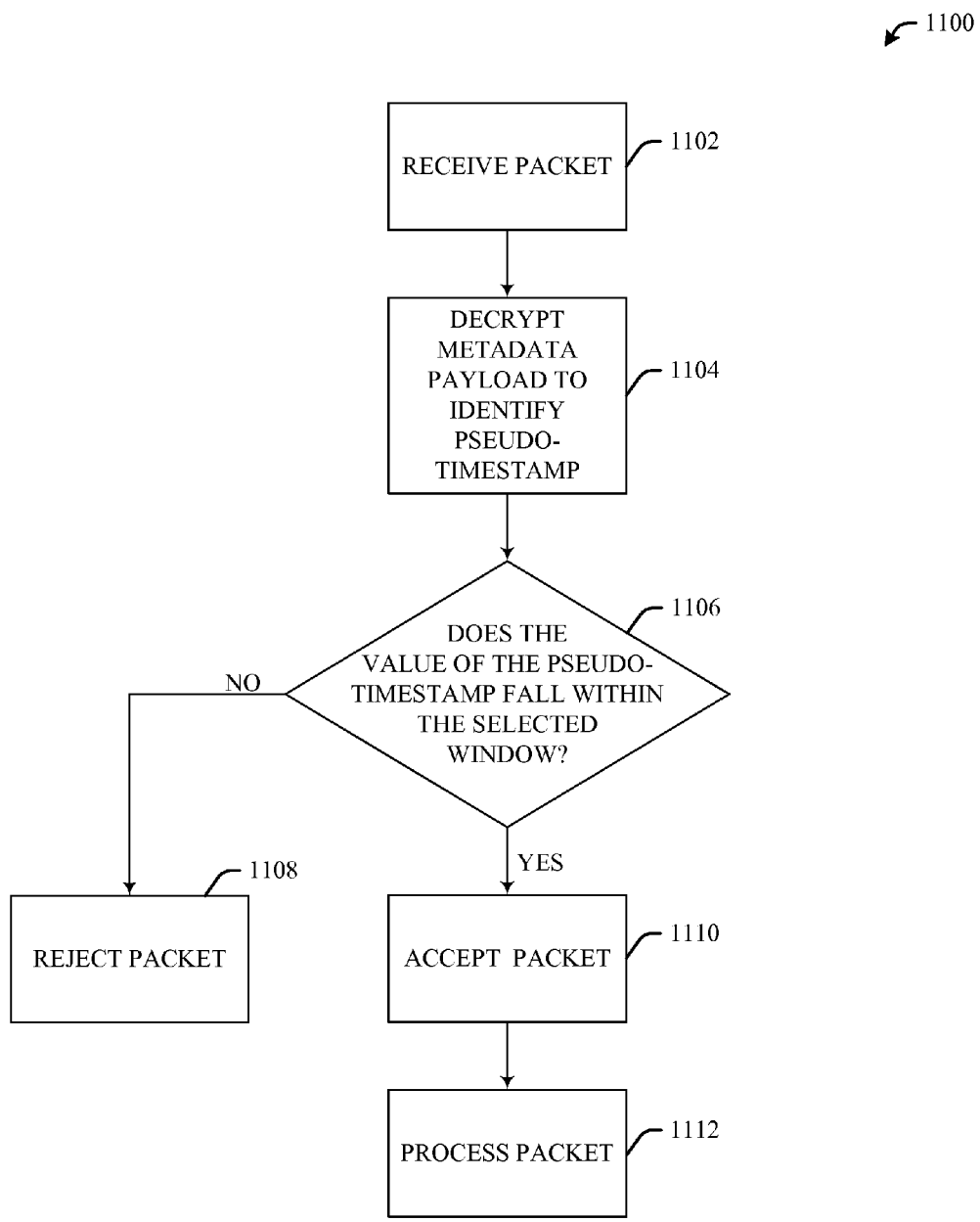
FIG. 11 illustrates an example flow chart of procedures that validates a received data packet based upon the pseudo-time information attached with the received data packet.

FIG. 11 illustrates a methodology to validate a received data packet at the receivers end. A data packet can be received from a sender or a plurality of senders at 1102. The received packet is in an encrypted form and can be decrypted at 1104. Furthermore, depending on the options in the data packet format, a pseudo-timestamp can be identified at 1104. The pseudo-timestamp can contain information regarding the time at which the received data packet was created.

The pseudo-time value obtained from the pseudo-timestamp is compared with a local pseudo-time. The difference between the time at which the data packet was created and the time when it was received can be calculated. As shown by the decision box 1106, it can be determined if the difference in time falls within a predetermined window.

If the difference is greater than the predetermined window, then the packet can be considered to be a replay packet and is rejected at 1108. If the difference in time falls within the predetermined window, then the data packet is considered to be valid and is accepted at 1110. The valid data packet once accepted can be further processed at 1112.

Figure 12:
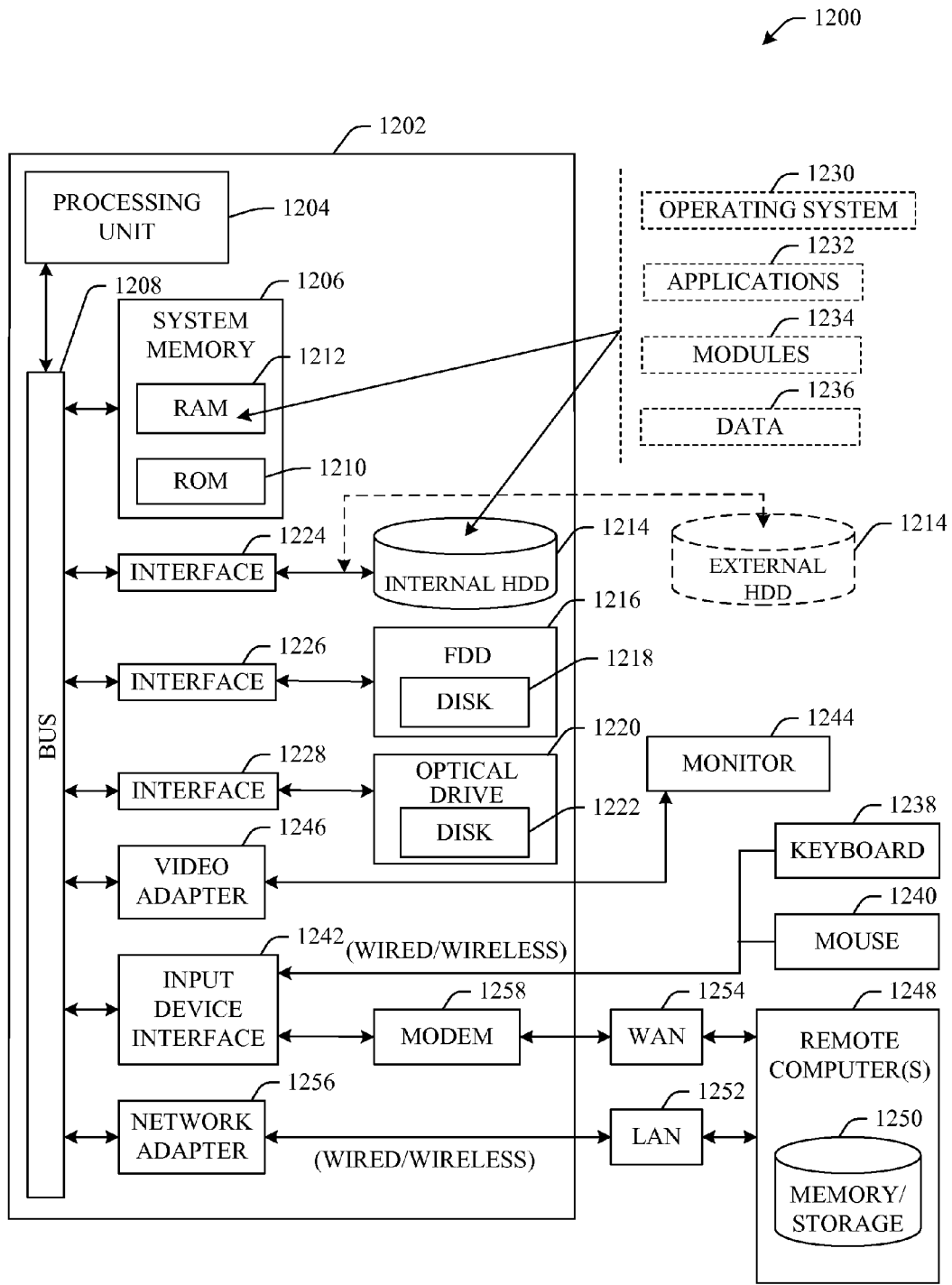
FIG. 12 illustrates a block diagram of a computer operable to execute the disclosed architecture.

Referring now to FIG. 12, there is illustrated a block diagram of a computer operable to execute the disclosed architecture. In order to provide additional context for various aspects of the subject specification, FIG. 12 and the following discussion are intended to provide a brief, general description of a suitable computing environment 1200 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the example environment 1200 for implementing various aspects of the specification includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the specification can be implemented with various commercially available operating systems or combinations of operating systems.

A user can enter commands and information into the computer 1202 through one or more wired/wireless input devices, e.g. a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are example and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 13:
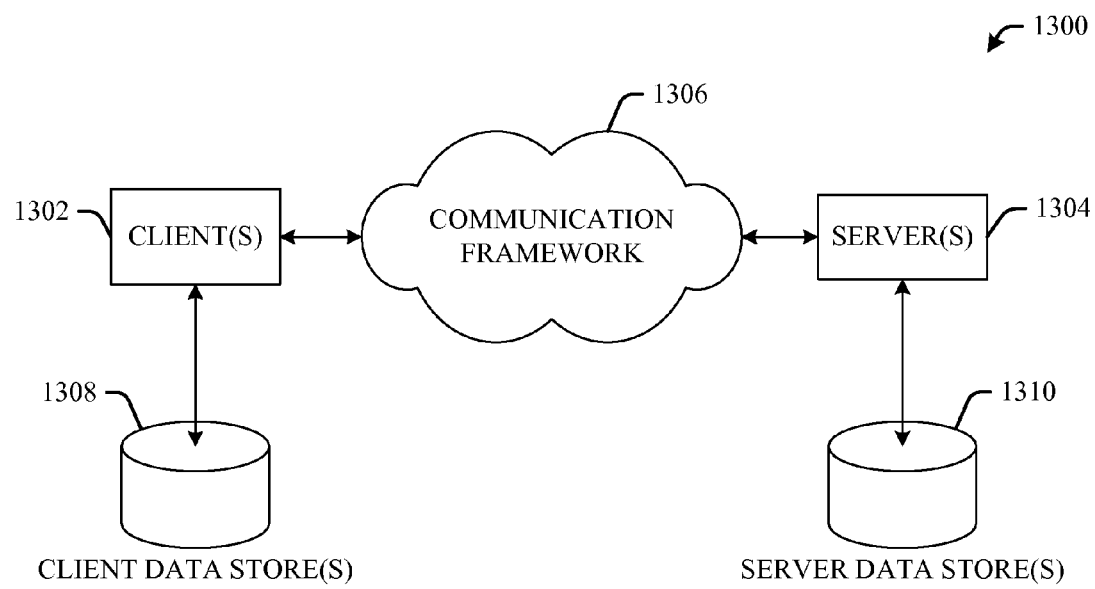
FIG. 13 illustrates a computing environment in accordance with the subject specification.

Referring now to FIG. 13, there is illustrated a schematic block diagram of an example computing environment 1300 in accordance with the subject specification. The system 1300 includes one or more client(s) (receivers) 1302. The client(s) 1302 can be hardware and/or software (e.g. threads, processes, computing devices). The client(s) 1302 can house cookie(s) and/or associated contextual information by employing the specification, for example.

The system 1300 also includes one or more server(s) (senders) 1304. The server(s) 1304 can also be hardware and/or software (e.g., threads, processes, computing devices). The servers 1304 can house threads to perform transformations by employing the specification, for example. One possible communication between a client 1302 and a server 1304 can be in the form of the data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the specification. It is, of course, not possible to describe every conceivable combination of components or methodologies for purposes of describing the subject specification, but one of ordinary skill in the art may recognize that many further combinations and permutations of the specification are possible. Accordingly, the specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
   one or more processors configured to:
   determine a pseudo-time stamp associated with a data packet that includes an internet protocol header and an original payload;
   add metadata to the data packet using the internet protocol type 99, the metadata including a time stamp option that stores the pseudo-time stamp;
   encrypt the data packet according to an encryption protocol, and transmit the encrypted data packet over a network to a receiver according to the encryption protocol.

2. The system of claim 1, wherein the network is a dynamic group virtual private network (DGVPN).

3. The system of claim 1, wherein the determination of the pseudo-time stamp is based at least in part on a pseudo-time value as a function of a clock.

4. The system of claim 3, wherein the clock is at least one of a local clock or a key server.

5. The system of claim 4, wherein the local clock is periodically synchronized with a clock of a central key server.

6. A system comprising:
one or more processors configured to:
receive an encrypted data packet from a sender in a multi-sender communication network, the encrypted data packet being secured according to an internet protocol security (IPsec) protocol;
decrypt the encrypted data packet based on the IPsec protocol, the decrypted data packet including a time stamp option, an inner internet protocol header, and an original payload, the inner internet protocol header and the original payload being separate from the time stamp option, the time stamp option stored in a metadata payload using the internet protocol type 99;
obtain a pseudo-time value from the time stamp option included in the metadata payload;
determine whether the decrypted data packet is a replay packet based upon an analysis of the pseudo-time value.

7. The system of claim 6, wherein the multi-sender communication network is a dynamic group virtual private network (DGVPN).

8. The system of claim 6, wherein the one or more processors are further configured to at least one of infer or download a size of a predetermined window from a key server, the size of the predetermined window employed in part to validate the decrypted data packet.

9. The system of claim 6, wherein the decrypted data packet is accepted if the pseudo-time value falls within a predetermined window.

10. The system of claim 6, wherein the decrypted data packet is rejected if the pseudo-time value does not fall within a predetermined window.

11. The system of claim 6, wherein a pseudo-time stamp is obtained from the metadata payload, the pseudo-time stamp includes the pseudo-time value.

12. The system of claim 11, wherein a preset option type in a metadata protocol is identified to obtain the pseudo-time stamp.

13. A method for providing anti-replay protection in a multi-sender communication network, comprising:
accessing a data packet including an inner internet protocol header and an original payload;
adding metadata to the data packet using the internet protocol type 99, the metadata including a time stamp option that stores the pseudo-time stamp, the inner internet protocol header and the original payload being separate from the time stamp option;
using one or more processors, encrypting the data packet according to an internet protocol security (IPsec) protocol; and
sending the encrypted data packet that includes the pseudo-time stamp over a network.

14. The method of claim 13, further comprising determining the pseudo-time stamp based on a pseudo-time value obtained from at least one of a local clock or a key server.

15. The method of claim 14, further comprising setting the local clock with the pseudo-time value after registering with the key server.

16. The method of claim 13, further comprising specifying an option type in a metadata protocol that identifies the pseudo-time stamp in the metadata payload.

17. A method comprising:
receiving a plurality of encrypted data packets, transmitted from a multi-sender group, the plurality of packets each being secured according to an internet protocol security (IPsec) protocol, each encrypted data packet including a time stamp option located in metadata using the internet protocol 99, an inner internet protocol header, and an original payload, the inner internet protocol header and the original payload being separate from the time stamp option;
decrypting each encrypted data packet according to the IPsec protocol;
accessing the time stamp option from the metadata of each decrypted data packet; and
using one or more processors, detecting replay of at least one packet of the plurality of packets transmitted from the multi-sender group based on a pseudo-time stamp placed in the time stamp option of the at least one packet.

18. The method of claim 17, further comprising decrypting the encrypted data packet to obtain a pseudo-time value from the pseudo-time stamp, wherein the pseudo-time value employed to validate the encrypted data packet.

19. The method of claim 17, further comprising comparing a pseudo-time value obtained from the metadata payload to a pseudo-time value of a local clock.

20. The method of claim 19, further comprising rejecting the encrypted data packet if the difference between the pseudo-time values obtained from the metadata payload and the local clock does not fall within a predetermined window.

21. The method of claim 19, further comprising accepting the encrypted data for further processing if the difference between the pseudo-time values obtained from the metadata payload and the local clock falls within a predetermined window.

\* \* \* \* \*